(12) United States Patent
Houis

(10) Patent No.: US 7,810,215 B2
(45) Date of Patent: Oct. 12, 2010

(54) HYGIENIC, TURNING CONTROL ELEMENT WHICH IS USED TO ACTUATE A MECHANISM, SUCH AS A DOOR OPENER

(75) Inventor: Richard Houis, Nantes (FR)

(73) Assignee: Cyclope, Nantes (FR)

( * ) Notice: Subject to any disclaimer, the term of this patent is extended or adjusted under 35 U.S.C. 154(b) by 0 days.

(21) Appl. No.: 11/632,038

(22) PCT Filed: Jul. 19, 2005

(86) PCT No.: PCT/FR2005/001843

§ 371 (c)(1),
(2), (4) Date: Jan. 10, 2007

(87) PCT Pub. No.: WO2006/018499

PCT Pub. Date: Feb. 23, 2006

(65) Prior Publication Data

US 2007/0192995 A1    Aug. 23, 2007

(30) Foreign Application Priority Data

Jul. 20, 2004    (FR) .................................. 04 08051

(51) Int. Cl.
 A47B 95/02    (2006.01)
(52) U.S. Cl. ....................................................... 16/412
(58) Field of Classification Search ................... 16/412, 16/10.11, 413, 422; 292/336.3
See application file for complete search history.

(56) References Cited

U.S. PATENT DOCUMENTS

| | | | | |
|---|---|---|---|---|
| 1,674,365 A | | 6/1928 | Hohmeister | |
| 2,238,513 A | * | 4/1941 | Ward | 292/347 |
| 3,121,907 A | * | 2/1964 | Stebbins | 16/412 |
| 3,965,528 A | * | 6/1976 | Kissler | 16/110.1 |
| 5,603,184 A | * | 2/1997 | Campbell et al. | 49/394 |
| 5,802,960 A | * | 9/1998 | Graj et al. | 99/403 |
| 5,983,454 A | * | 11/1999 | Hartselle, III | 16/412 |
| 6,189,183 B1 | * | 2/2001 | Hartselle, III | 16/412 |
| 6,289,557 B1 | * | 9/2001 | Manson et al. | 16/412 |

FOREIGN PATENT DOCUMENTS

| | | |
|---|---|---|
| FR | 993 788 | 11/1951 |
| JP | 09 004752 | 1/1997 |
| JP | 2003 253713 | 9/2003 |

* cited by examiner

Primary Examiner—Victor Batson
Assistant Examiner—Matthew Sullivan
(74) Attorney, Agent, or Firm—Young & Thompson

(57) ABSTRACT

The invention relates to a hygienic, turning control element which is used to actuate a mechanism, such as a door opener. More specifically, the invention relates to a hygienic turning handle (12) which is intended to be fitted to a door and which is used to control the actuation of a mechanism, such as a lock. The invention is of the type that consists of a hub (18), a main body (20) and a left-hand form actuation segment (26) comprising an essentially C-shaped inner concave surface which extends from the plane of the door. The invention is characterized in that, in the handle (12) rest position, the concavity of the actuation segment (26) is essentially oriented upwards and can receive part of the arm, the wrist or the back of the hand of a user.

11 Claims, 13 Drawing Sheets

HYGIENIC, TURNING CONTROL ELEMENT WHICH IS USED TO ACTUATE A MECHANISM, SUCH AS A DOOR OPENER

TECHNICAL FIELD OF THE INVENTION

The present invention relates to an actuation member commonly called a turning handle that is usually actuated by the fingers or the inside of the hand of a user.

The invention relates especially to a handle, designed to be used in the hygiene field, such as in the medical field and especially the hospital environment, in the agribusiness field or else in the home or the motor vehicle.

PRIOR ART

In public buildings, particularly in hospitals, the issue of hygiene is an issue of increasing importance. Currently, in France, between 5% and 12% of people in hospital contract a nosocomial illness (Ministry of Health statistics, 2003). That is why hygiene is at the forefront of public health concerns.

The hands are the main method of transmitting germs and pathogenic bacteria. The contaminations transmitted by the hands require the use of solutions making it possible to stop the transmission. Specifically, solutions are needed that are nonchemical and easy to apply in hospitals and other public buildings, and more particularly solutions that make use of no equipment additional to that normally installed on the various items of equipment concerned for the purpose of using and operating them.

It is necessary in particular to modify the design of handles or other similar members for controlling mechanisms, that are usually handled directly by the hand, and more particularly by the fingers which are the most contaminated zone.

Specifically, a conventional turning handle is virtually impossible to operate without using the hand, particularly when the user first actuates a mechanism such as a latch and then opens the opening element or leaf of the door in rotation about its vertical axis formed by the hinges.

One of the solutions involves designing a door handle that can be actuated, without using the hand, and particularly by using the arm, the forearm or the wrist in order to create a physical break in the transmission of "hand-borne" bacteria and viruses.

Such a handle, called a hygienic handle, comprises, in a known manner:
- a distal end hub capable of being mounted so as to rotate about an axis orthogonal to the plane of the opening element and close to a vertical free edge of the opening element;
- a main body of which a first end is connected to the hub and which extends, from the hub, in a plane generally parallel to that of the opening element and away from the vertical edge of the opening element;
- and a proximal actuation portion of generally curved shape which is connected to the second end of the main body and that comprises a curved actuation section that is C-shaped which extends from said second end away from the plane of the opening element, whose concavity is oriented generally in the direction of the free edge of the opening element.

Such a handle is described and shown in document U.S. Pat. No. 2,238,513 which illustrates a "hygienic" handle whereof the free end portion allowing its actuation is in the shape of a "hook" or basket-handle curve, which is capable of receiving the forearm or the arm of the user.

The hook or basket-handle curve is generally directed and open toward the bottom of the opening element of the door, that is to say toward the ground, thus forcing the user to bend down to rotate the handle and thus creating an additional effort in the back relative to the use of a conventional handle.

The ergonomics of such a handle are unsatisfactory because its daily and repeated use culminates in fatigue and pains for the users that are not acceptable, particularly in a professional environment and that usually cause an inappropriate use of the handle, that is to say a conventional grasping with the hand, thus putting an end to its "hygienic" character.

These disadvantages explain why, despite its design going back more than 60 years, the handle proposed in document U.S. Pat. No. 2,238,513 has no application, particularly in the hospital field.

The present invention therefore aims to remedy these disadvantages and to solve the hygiene problem by proposing a control and actuation member that is simple, that can be adapted to a large number of existing mechanisms such as those that are usually actuated by a conventional handle, and whose ergonomics are such that it no longer requires efforts on the part of the user that are contrary to the ergonomic structure and balance of the human body.

BRIEF SUMMARY OF THE INVENTION

Accordingly, the present invention proposes a hygienic turning handle of the type previously mentioned capable of being fitted to the opening element of a door, characterized in that, in the rest position of the handle, the concavity of the curved section is oriented generally upward.

Other features of the door handle are defined in the secondary claims.

The invention also proposes a hygienic turning control member capable of being fitted to the opening element of a door to control the actuation of a mechanism for latching a door, characterized in that it comprises:
- a distal end hub that is capable of being arranged close to the vertical free edge of the opening element and of being mounted so as to rotate about an axis orthogonal to the plane of the opening element so as to occupy a first extreme angular position in which the door is unlatched and a second extreme angular position in which the door is latched;
- a main branch of which a first end is connected to the hub and which comprises an elbow so as to extend first in a plane parallel to the plane of the opening element, then in a plane orthogonal to the plane of the opening element and away from the opening element;
- two secondary end branches that are connected to the second end of the main branch and that part symmetrically from the mid-plane of the control member away from the opening element and in a plane orthogonal to the opening element and that define between them an open, generally C-shaped basket-handle curve.

Other features of this hygienic member for controlling a latching mechanism are defined in the secondary claims.

The invention also proposes a hygienic turning control member capable of being fitted to a mixer faucet to control the flow of the faucet and the temperature of the water, that is capable of being mounted articulated substantially about a point situated on the top face of the body of the faucet, characterized in that it comprises:
- a main stem of which a first distal end is mounted articulated on the body of the faucet and which, in a middle, rest position, extends upward in a vertical plane corresponding substantially to the vertical mid-plane of the body of the faucet;

two secondary stems that part symmetrically from the second end of the main stem and extend in a plane inclined toward the rear of the faucet and that delimit between them an open, generally C-shaped basket-handle curve that is capable of interacting with an arm, a forearm or a wrist for the operation of the control member which adds on the barrel, of known design, of the mingler faucet.

The basket-handle curve is generally open upward and rearward away from the user who faces the front edge of the basin fitted with the mixer or mingler faucet.

BRIEF DESCRIPTION OF THE FIGURES

Other features and advantages of the invention will appear on reading the following detailed description for the understanding of which reference should be made to the appended drawings in which.

DETAILED DESCRIPTION OF THE FIGURES

In the following description, elements that are identical, similar or have the same function will be indicated by the same reference numbers.

In the description and in the claims, use will be made in a nonlimiting manner of the vertical, horizontal, up, down, top, bottom, etc. terminology with reference to the orientation of the opening element of the door and also the trihedron (x, y, z) indicated in the figures will be used.

Figure 1:
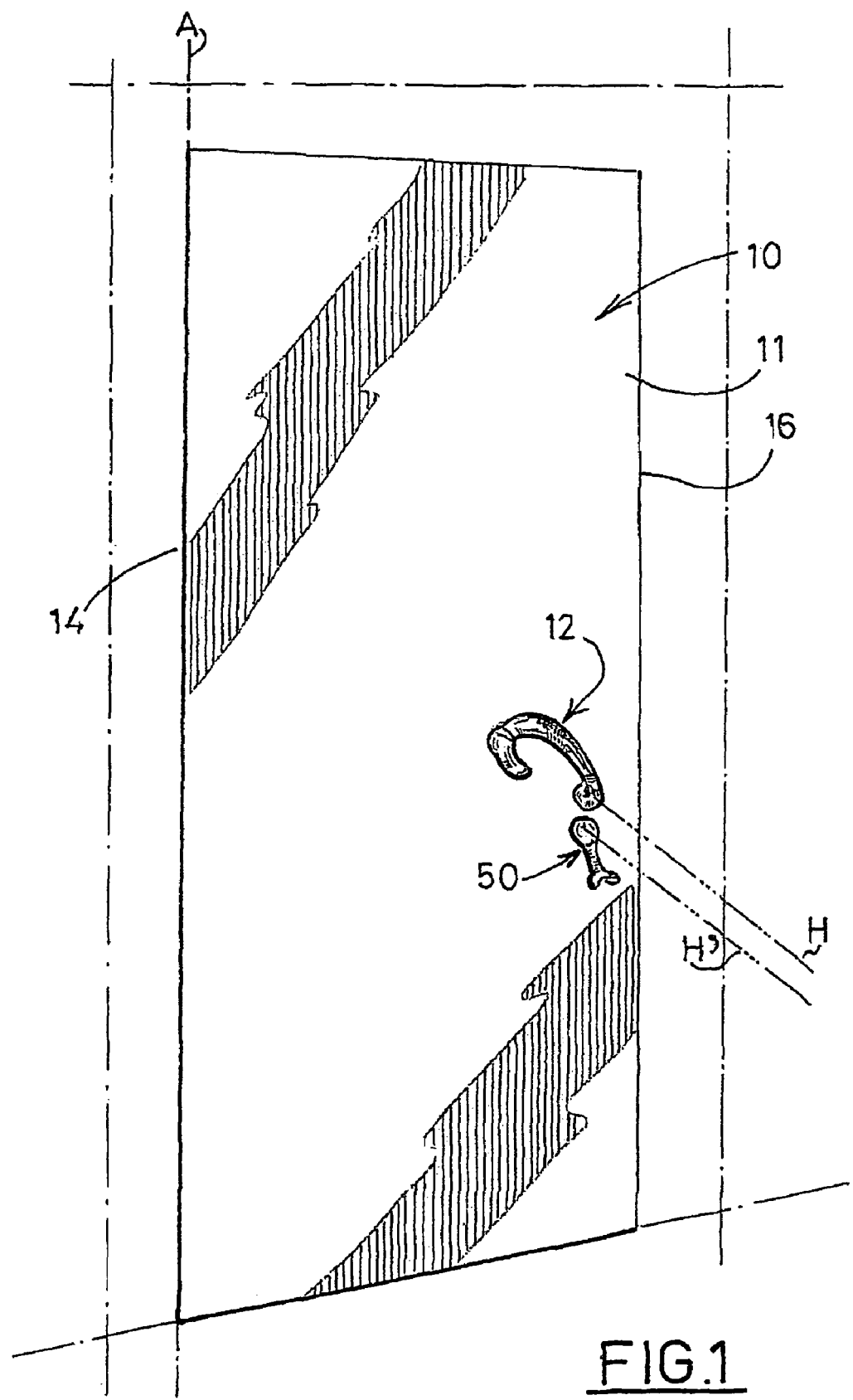
FIG. 1 is a schematic view in perspective of a door whose opening element is fitted with a hygienic handle according to the invention.

As illustrated in FIG. 1, the leaf or opening element 10 of a room entry door is fitted with a hygienic handle 12 according to the invention.

The opening element 10 is mounted so as to pivot about a vertical axis "A" in the vicinity of one 14 of its two vertical edges, for example by means of hinges, and the handle 12 is arranged in the vicinity of its other opposite vertical edge 16.

The handle 12 makes it possible to actuate, particularly via the forearm or the arm, the mechanism for closing the door, such as a latch, and it also makes it possible to cause the opening element to pivot about its vertical axis A for the purpose of opening.

The handle 12 according to the invention is generally, and as an example, made of plastic and is molded in a single piece, as appropriate by overmolding about a central stiffening core, for example made of metal.

FIGS. 2 to 6 illustrate in detail the design of the hygienic handle 12 in its rest position, that is to say in the position that the handle 12 normally occupies relative to the opening element when no action is applied to the handle.

The handle is, usually and in a known manner, returned elastically to its rest position by the mechanism of the latch to which it is connected which comprises in particular a spring for returning the mechanism control shaft to a determined angular position in which the bolt 13 of the mechanism is also returned to an "out" position in which it is capable of interacting with a matching strike fitted to the fixed sash or frame of the door 10.

The handle 12 consists essentially of three portions, namely:

a distal end hub 18 that is capable of being mounted so as to rotate about a horizontal axis "H" orthogonal to the plane of the opening element 10 of the door and close to the vertical free edge 16 of the opening element 10;

a main intermediate body 20 of which a first distal end 22 is connected to the hub 18 and extends, from the hub 18, in a plane generally parallel to that of the opening element 10 and away from the vertical free edge 16 of the opening element 10;

and a proximal actuation portion 26 of generally curved shape which is connected to the second end 24 of the main body 20 and that is essentially shaped as a generally C-shaped curved section and which, according to the invention, extends generally toward the top of the opening element from the second end 24 of the main body 20 away from the plane of the opening element 10, that is to say away from the flat vertical face 11 of the opening element on which the handle 12 is mounted.

The hub 18 is a portion generally shaped like a hollow pot and which extends along the axis H orthogonal to the plane of the face 11 of the opening element 10 (which is parallel to the axis "z" of the trihedron x, y, z) and which has an external rounded shape substantially like a trunk of an ellipsoid, for better ease of use.

The hub 18 is hollow so as to receive means (not shown) of attaching the handle 12 to the opening element 10 also providing the connection in rotation of the handle with the shaft of the latch mechanism and the determined angular positioning of the hub 18, and hence of the handle 12, relative to this shaft and hence relative to the opening element 10.

The main intermediate body 20 is slender of substantially circular or elliptical cross section that is generally constant over its whole length, from its first end 22, connected to the slimmed-down free end portion of the hub 18, to its second end 24 connected to the C-curved actuation section 26.

In a known manner, the body 20 thus extends generally away from the hub 18 and away from the free edge 16.

Unlike what is known in the prior art, the body 20 of the handle 12 according to the invention has a curvature such that the body extends vertically upward (along the axis "y" of the trihedron x, y, z) above the hub 18 (considering FIG. 2) and has a summit 28 situated vertically above the C-curved section, the concavity of the body 20 being oriented downward in order to release space for letting an arm or a forearm pass.

The summit 28 is generally closer laterally (along the axis "x" of the trihedron x, y, z) to the actuation section 26 than the hub 18 so as not to hamper the arm when the handle 12 is rotated about its axis "H".

The second end 24 of the body 20 is also situated vertically above the actuation section 26.

Figure 2:
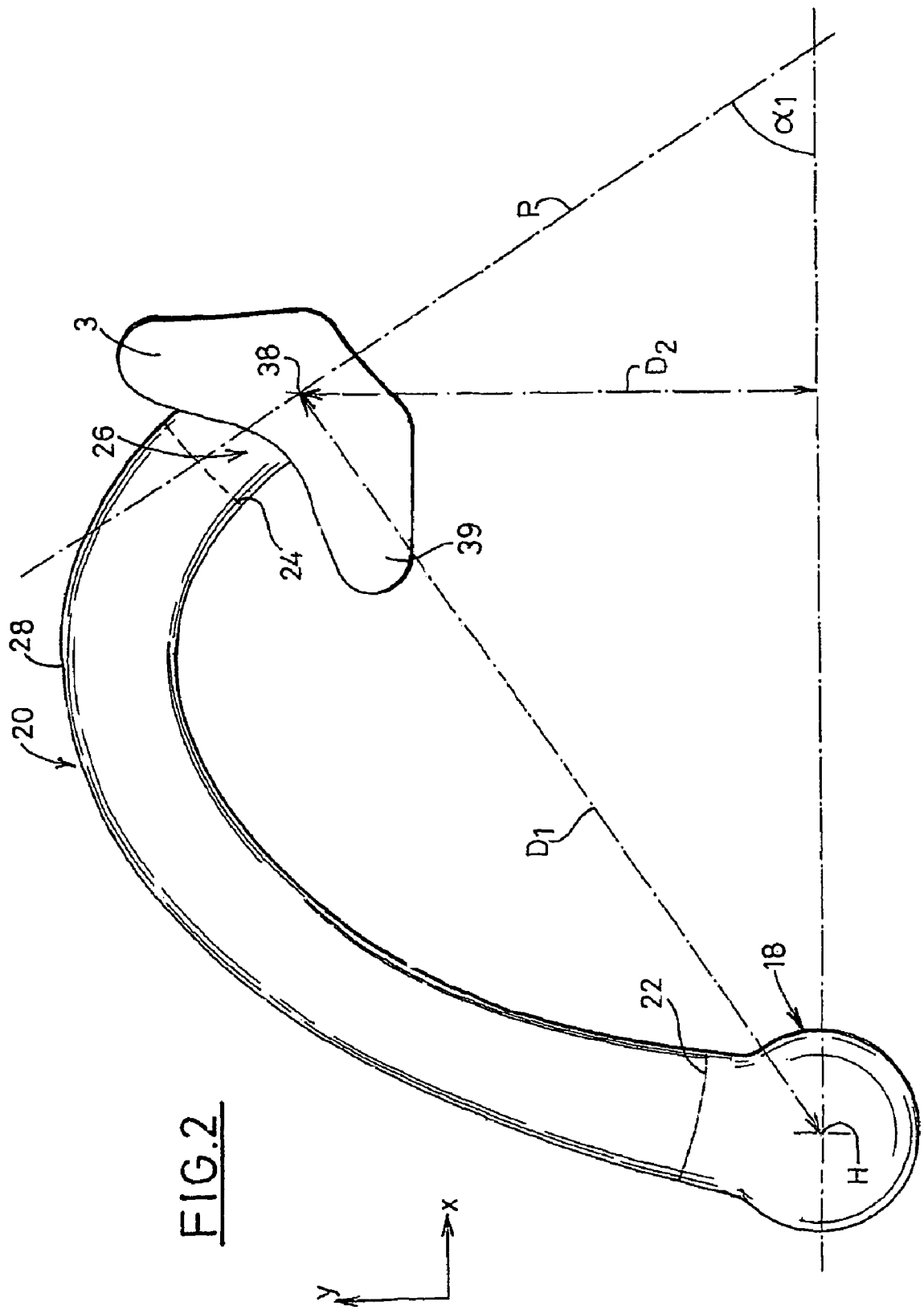
FIG. 2 is a front view on a larger scale of the handle of FIG. 1 that is illustrated in its orientation corresponding to its rest position.
Figure 3:
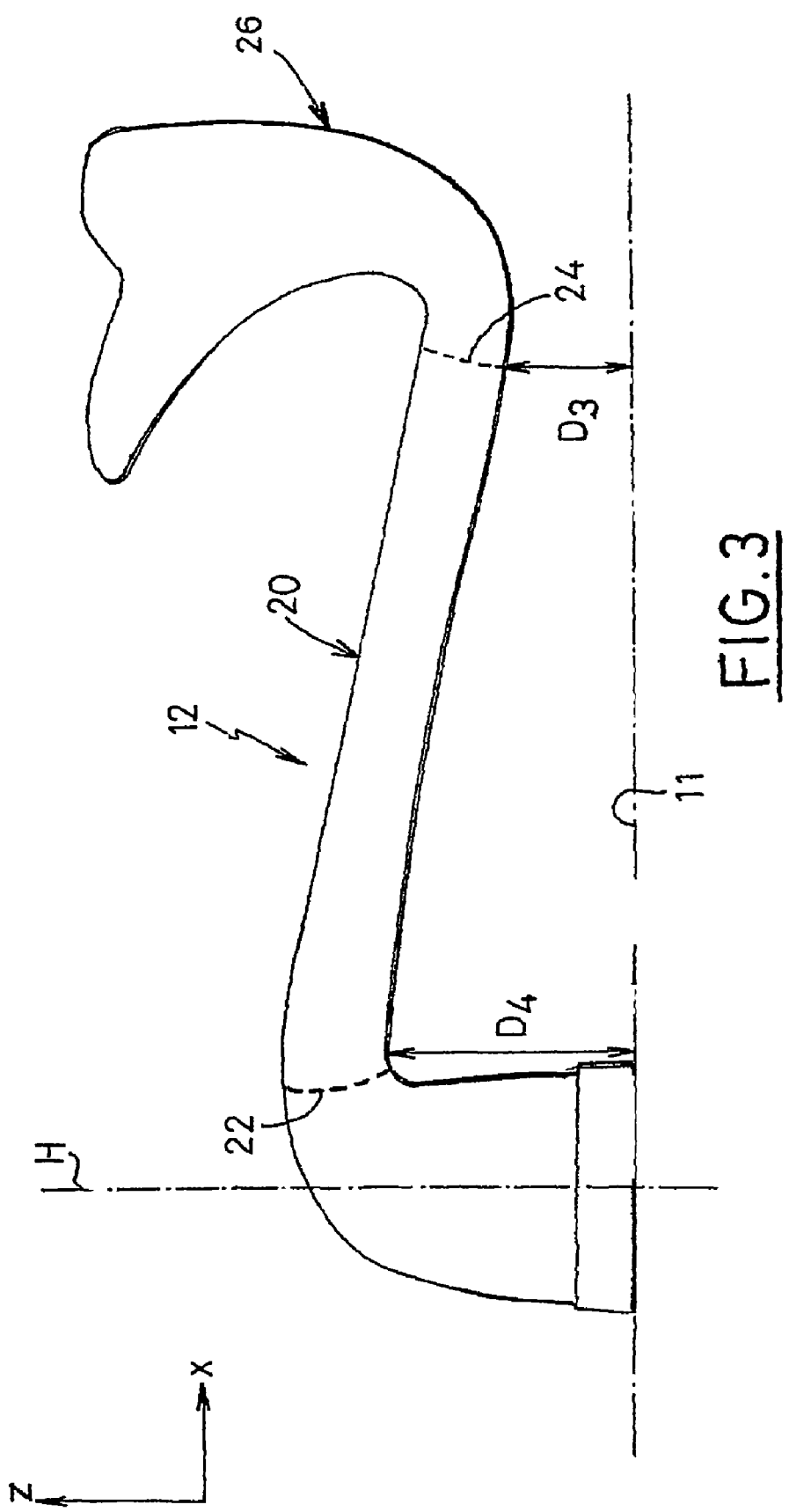
FIG. 3 is a top view of the handle of FIG. 2.
Figure 4:
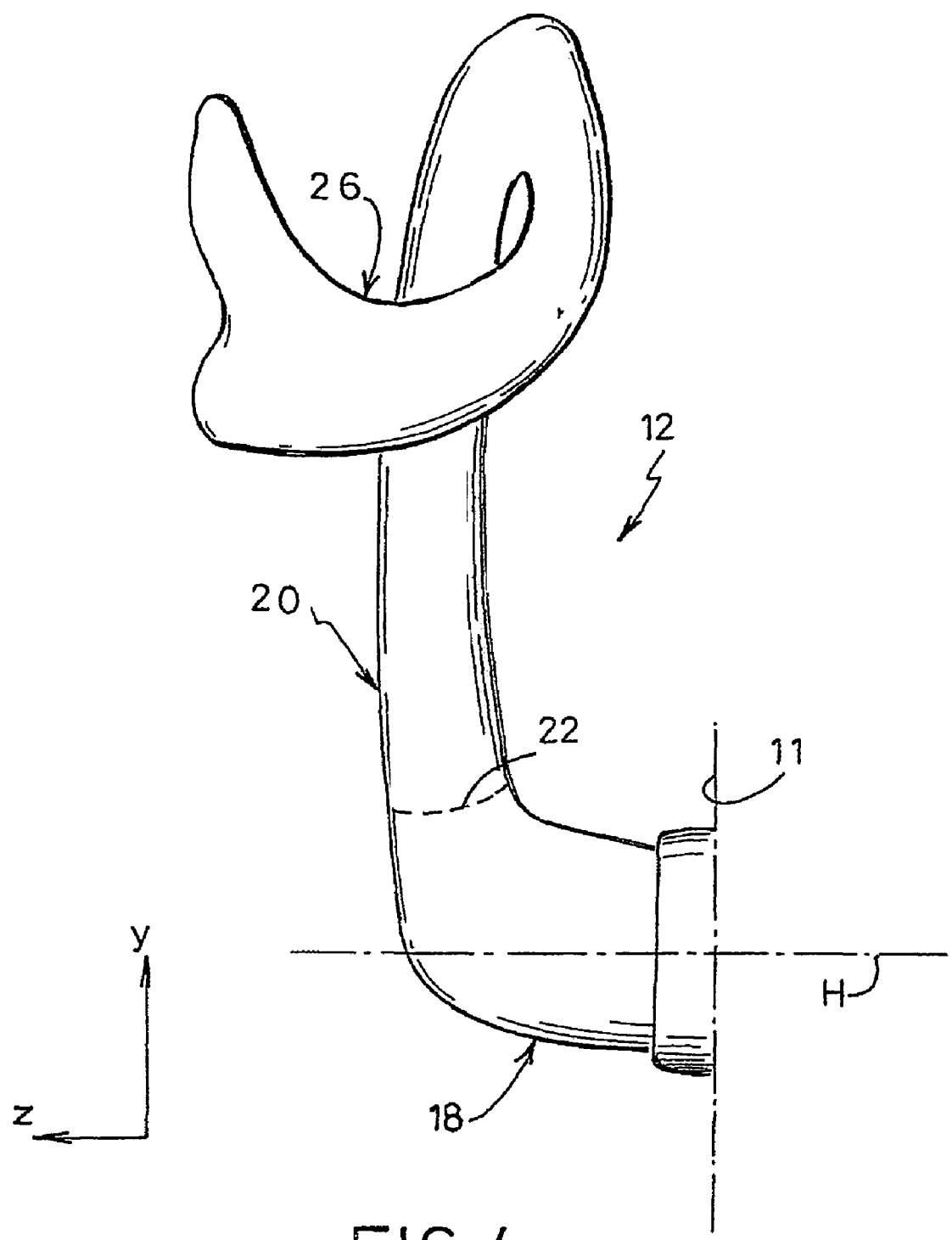
FIG. 4 is a view from the right of the handle of FIG. 2.
Figure 5:
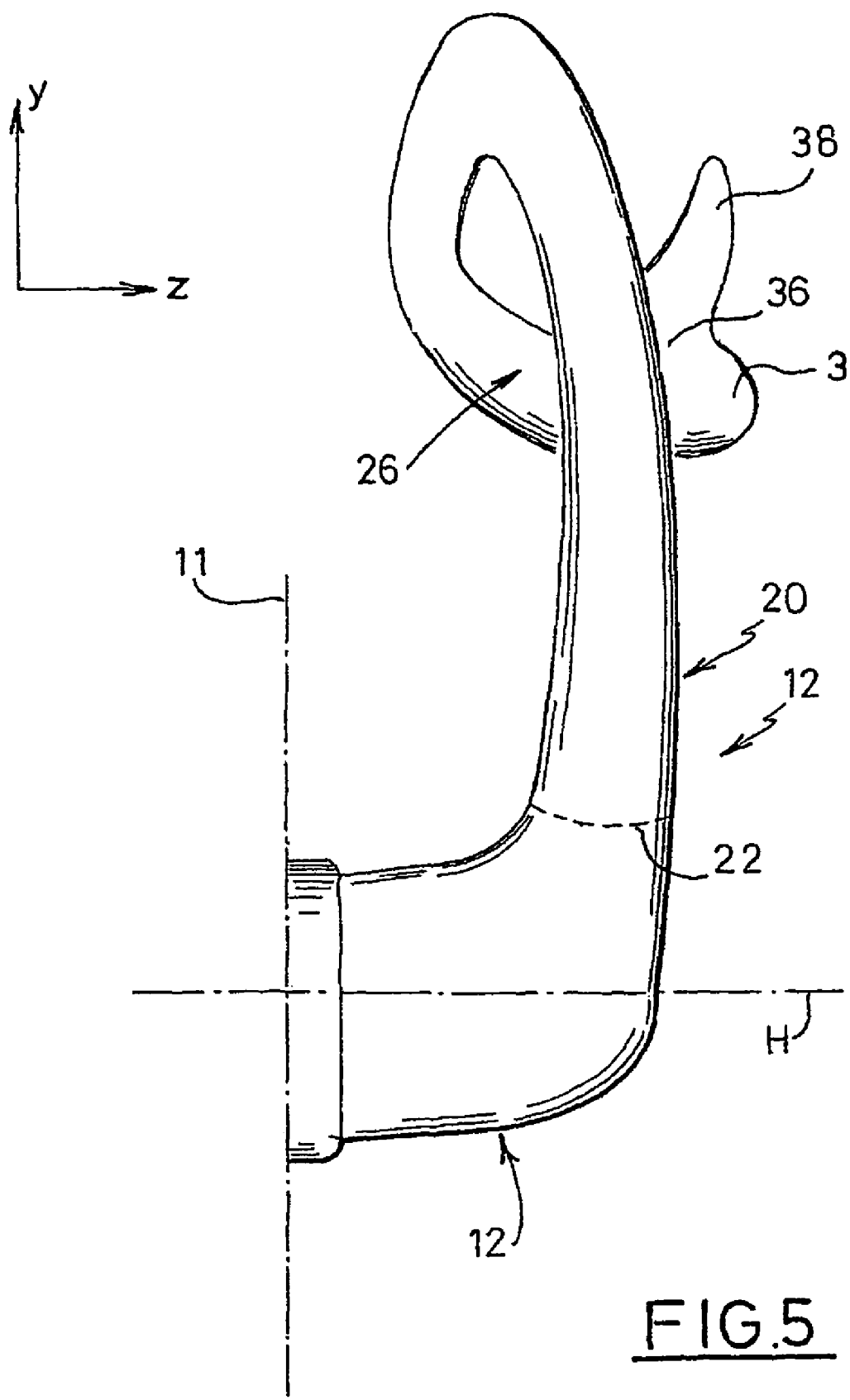
FIG. 5 is a view from the left of the handle of FIG. 2.
Figure 6:
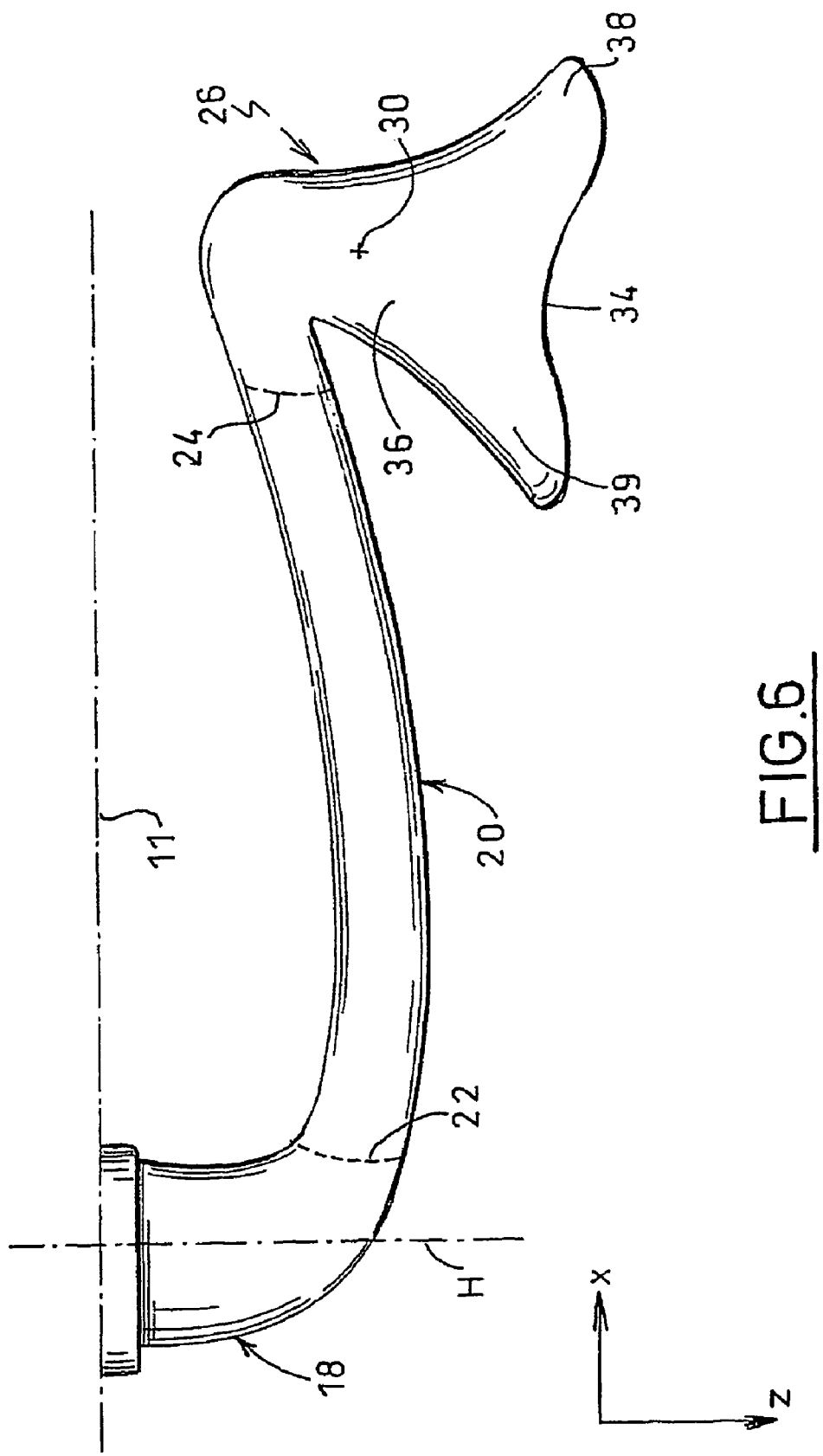
FIG. 6 is a view from below of the handle of FIG. 2.

This geometry, according to the invention, of the main body 20, that is the general shape of a first downward, open, basket-handle curve called "swan neck", thus determines the position in the plane x, y of the curved actuation section 26 relative to the hub 18 and hence relative to the axis of rotation H, and determines in particular the two distances D1 and D2 indicated in FIG. 2 that will be explained hereinafter.

The body 20 extends generally in a plane parallel to the vertical plane x, y of the opening element 10.

More precisely, as can be seen in FIGS. 3 to 6 and according to one aspect of the invention, the average distance D3 (in the direction z) between the second end 24 of the main body 20 and the plane of the face 11 of the opening element 10, is less than the average distance D4 (in the direction z) between the first end 22 of the body 20 and the plane of the face 11 of the opening element 10 to minimize the protrusion of the curved shape of the actuation section 26 relative to the opening element 10. In this conformation, the hub 18 is sufficiently clear of the opening element 10 to allow easy cleaning and removal and the section 26 is sufficiently close to the opening element 10 to prevent snagging.

The proximal actuation portion 26 of curved shape is a curved section in the general form of a C-shaped basket-handle curve.

The section 26 extends from the second end 24 of the main body 20 away (in the direction of the axis z of the trihedron x, y, z) from the plane of the face 11 of the opening element 10.

According to the invention, the concavity of the curved section 26 is oriented upward so as to form a second basket-handle curve that is open generally upward and that is able to receive a lower or bottom portion of the arm (of the forearm), of the wrist or the back of the hand of a user.

More precisely, the section 26 extends in a mid-plane "P" that forms an acute angle alpha1 (FIG. 2) relative to the horizontal plane passing through the axis "H".

The angle alpha1 lies between 30 and 60 degrees and preferably is substantially equal to approximately 50 degrees.

This orientation and the dimensions and shapes of the main body 20 determine the average distance D1 (or radius) between the axis "H" and the point 30 corresponding to the "bottom" of the curved section 26 and the vertical distance D2 between the bottom point 30 of the section 26 and the horizontal plane passing through the axis H. In the example illustrated in FIG. 2, D1 is substantially equal to 200 mm and D2 to 115 mm.

The invention is of course not limited to the values indicated for the parameters D1 to D4 and alpha1, but cover all the designs culminating in the same ergonomics, and in particular the homothetic transformations, particularly according to the average size of the individuals of a determined country.

Figure 7:
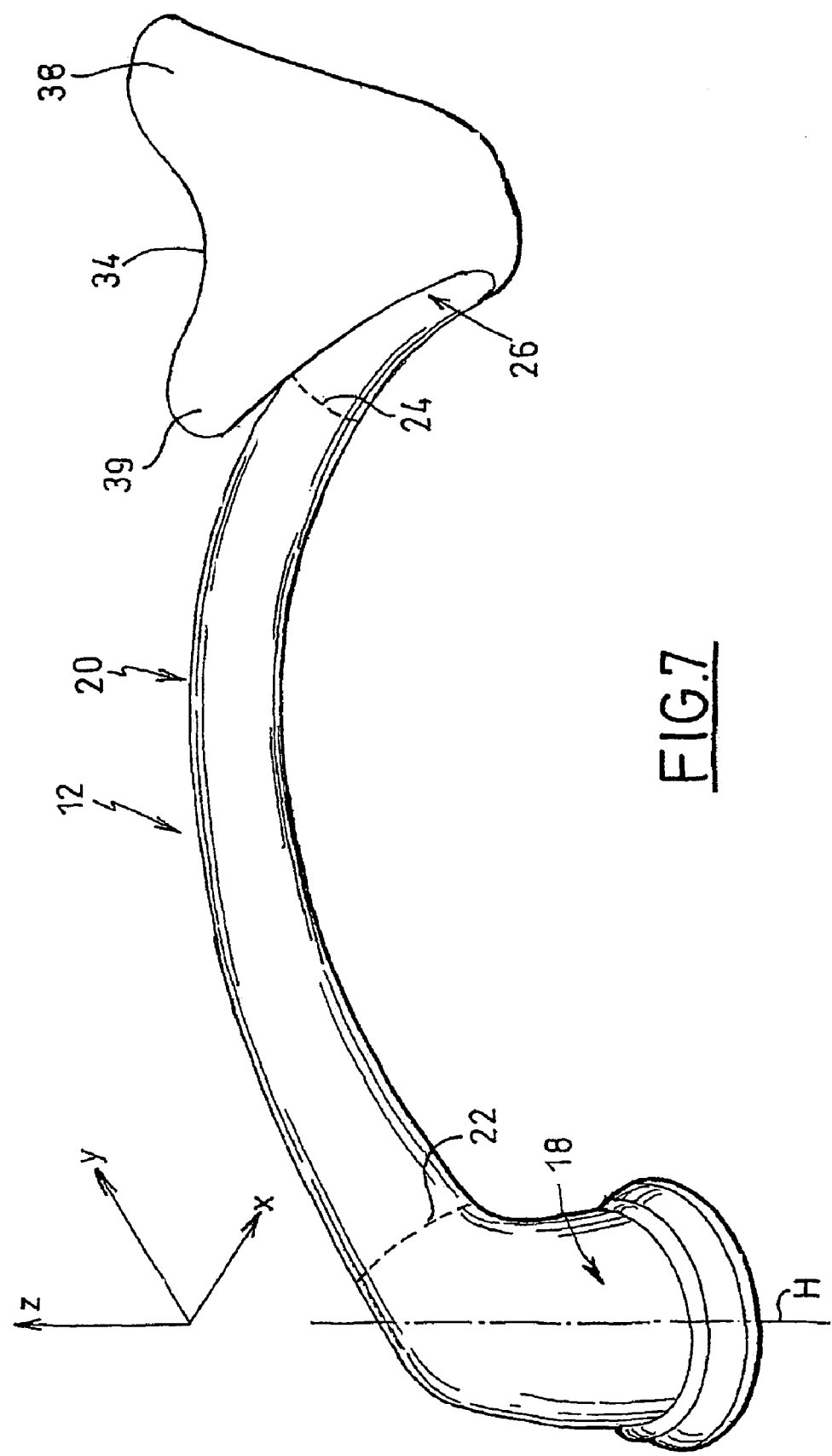
FIGS. 7 and 8 are two views in perspective, from different viewing angles, of the handle illustrated in FIG. 2.
Figure 8:
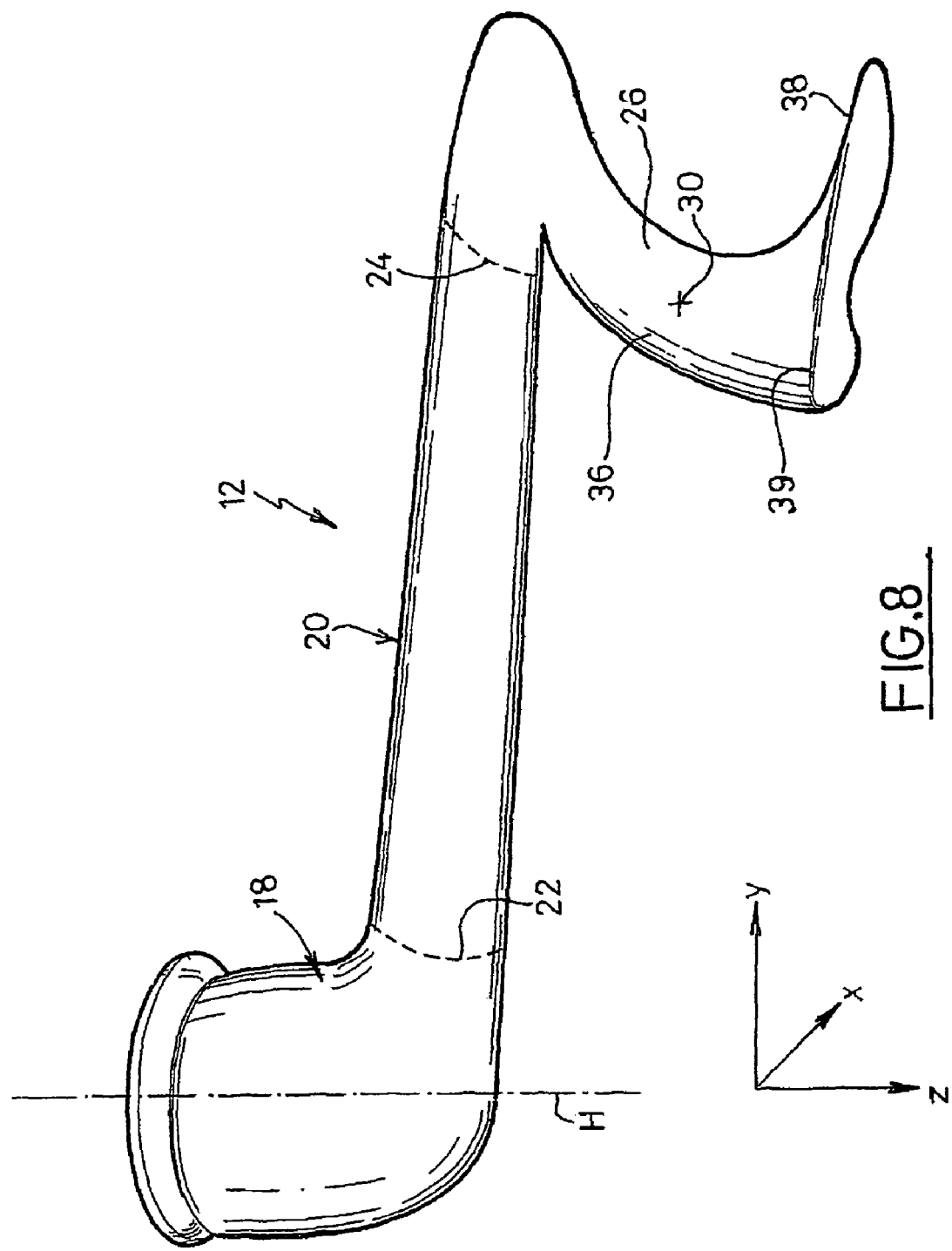

The C-curved section, visible in FIGS. 7 and 8, is thin or narrow at its distal end connected with the second end 24 of the main body 20 and it broadens and flares out progressively in the direction of its free proximal end 34 so as to delimit an internal concave actuation surface 36 in which the bottom point 30 is situated.

The proximal end 34 terminates in two free end lobes, or lips, 38 and 39 whereof one lobe is called the upper lobe 38 and one lobe is called the lower lobe 39.

The surface 36 is sufficiently large to facilitate the upward and/or downward rotational actuation of the handle 12 with the forearm, the wrist or the back of the hand.

The curved actuation section 26 also has a general symmetry of design relative to its mid-plane P.

The contour of the cross section of the curved actuation section 26 is, at all points, convex and rounded for better comfort of use.

Figure 9:
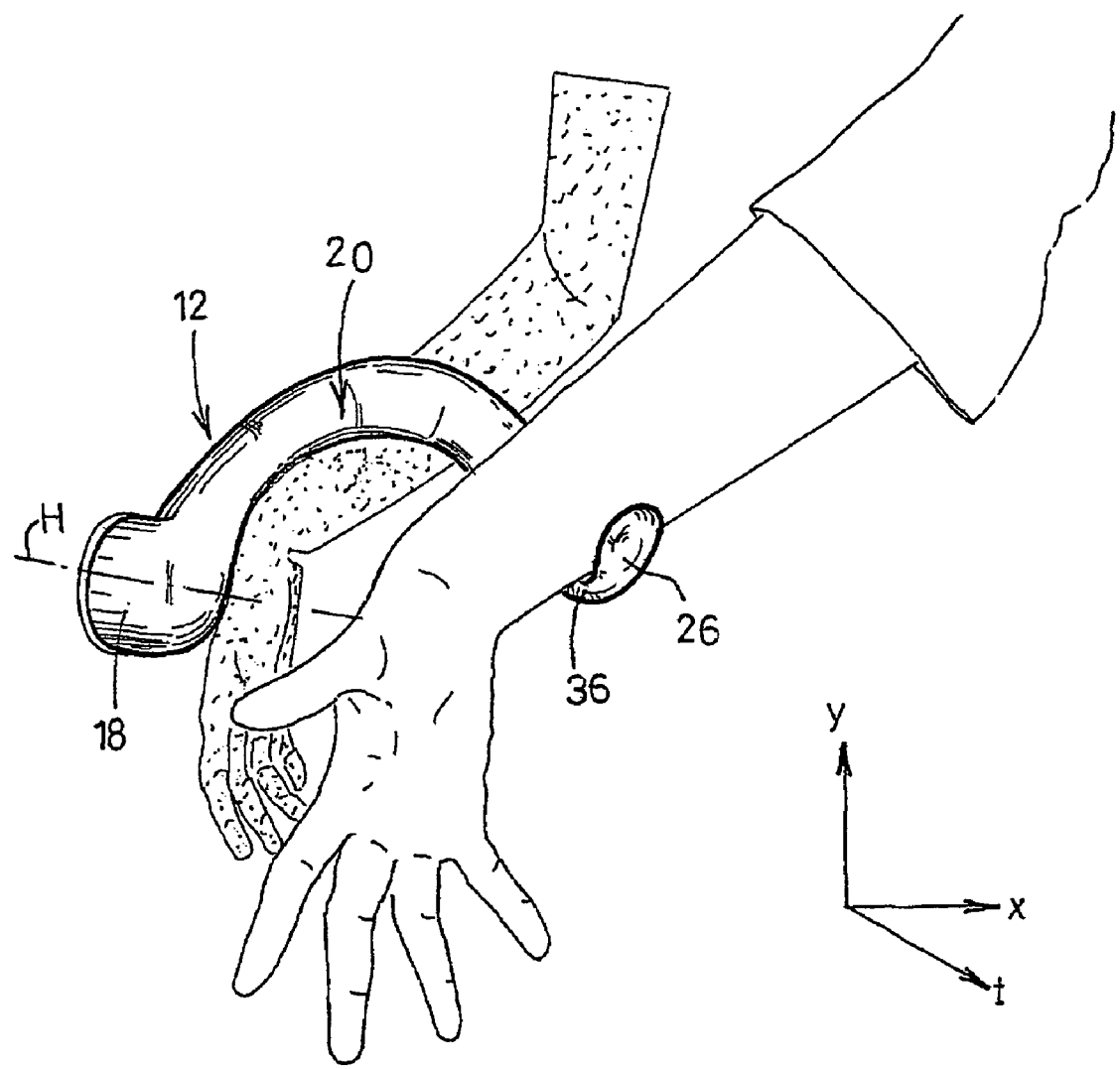
FIGS. 9 and 10 are two representations of a simplified hygienic handle illustrating its hygienic and ergonomic use.
Figure 10:
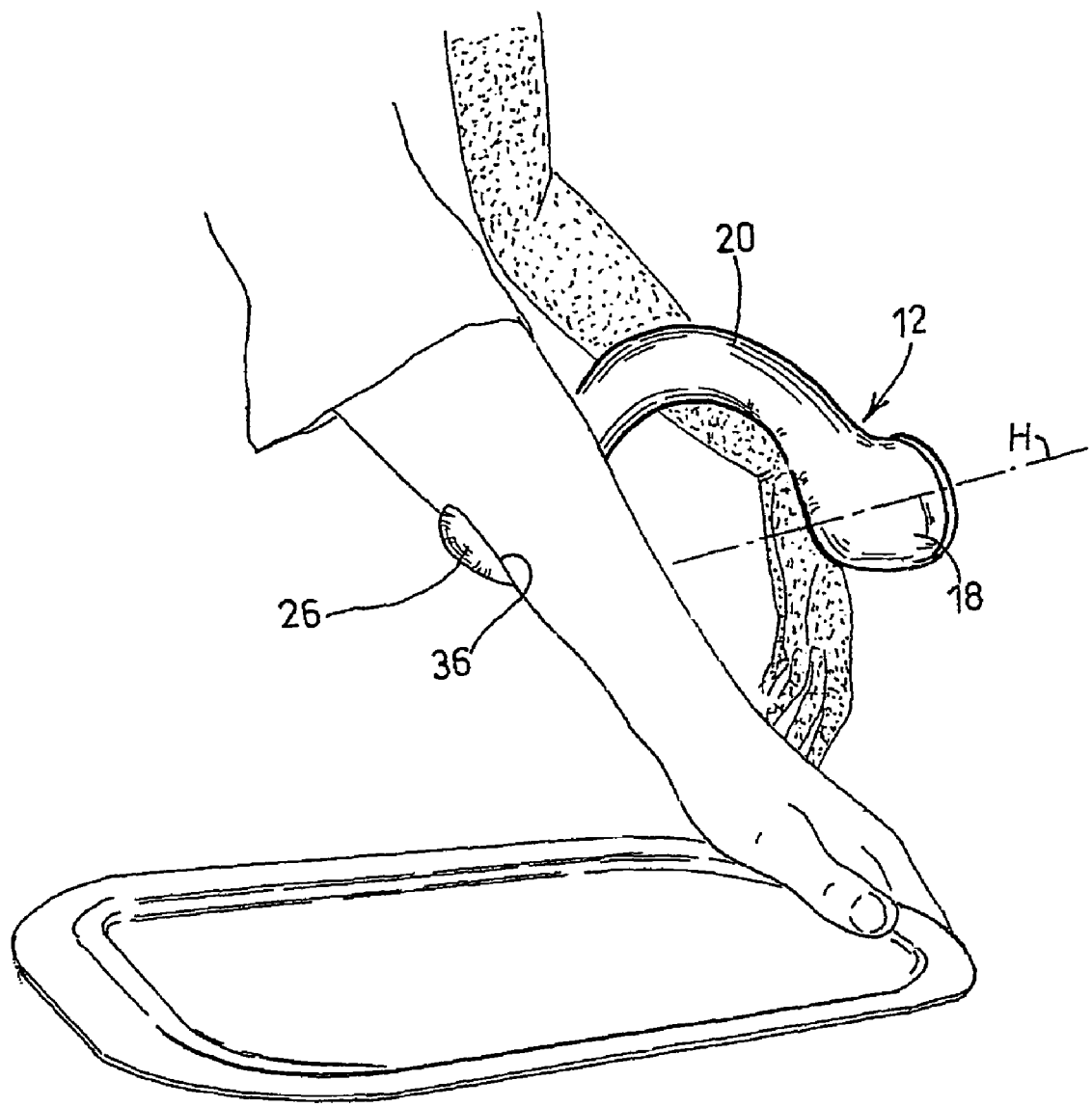

As can be seen in FIGS. 9 and 10, in which a handle is shown having an actuation section 26 whose free end section is simplified to a single central lobe, the conformation and dimensions of the main body 20 and of the curved actuation section 26 make it possible to entirely clear the section 26 for its actuation and also to clear the whole zone situated "beneath" the main body 20, to culminate in the advantageous ergonomics according to the invention that will now be explained.

It will be noted that, in the case of certain latch control mechanisms, the user has the possibility of turning the handle 12 about the axis H in both directions, that is to say either toward the top, or toward the bottom of the opening element 10 to release the bolt from the strike.

In use, (FIGS. 9 and 10), the user places his arm, his forearm, the back of his hand or his wrist in the curved actuation section 26 in contact with the concave surface 36.

To release the bolt from the strike, he exerts on the concave actuation surface 36 a vertical pressure oriented generally toward the bottom of the door, that is to say toward the ground.

To then pivot the opening element 10 of the door about its vertical axis A, the user then exerts, in a continuity of movement, a translation, in the direction z, by pulling or pushing the opening element 10, his forearm or his wrist still being housed in the second C-shaped basket-handle curve formed by the actuation section 26.

It will be noted that the door may be pivoted about its axis irrespective of the angular position of the handle about its axis of rotation H insofar as the portion of the arm used is still housed in the section 26, the angular orientation of the forearm relative to the elbow allowing such an adaptation without effort or pain.

As with a nonhygienic handle grasped in the hand, the user may thus for example let the handle rise again progressively to its top rest position while he pivots the door.

In the case of an operation of the latch by rotating the handle upward, the user places his forearm or wrist "beneath" the handle 12 in the hollow zone formed by the connection between the curvature of the main body 20 and the actuation section 26. He then exerts a pressure oriented generally vertically toward the top of the opening element 10 to release the bolt from the strike and exerts a translation by pulling or pushing the opening element 10, his wrist or his forearm being housed and held in this hollow zone.

The two lobes or lips 38 and 39, visible in FIGS. 2 to 8, have the function of better holding the arm or the forearm in the curved section 26, and allowing ergonomic use without contortions, irrespective of the position of the arm or of the forearm in the section to prevent an additional effort on the back and make the operation easier when the user wishes to pull or push the door.

Once the bolt is released from the strike, the used portion of the arm acts on one or other lobe 38, 39.

Specifically, when the handle 12 is in the top rest position, the user may pull the door opening element 10 by acting more particularly on the upper lobe 38. When the user applies a vertical pressure downward, the handle 12 leaves its rest position and, in the bottom position, the user may also pull on the opening element 10 by acting more particularly on the lower lobe 39.

Such a handle, actuated for example with the aid of the arm, the forearm or the wrist, does not, by definition, have the same maneuverability as a conventional handle.

It has been recognized that the wrist could also be a portion contaminated by bacteria and that it is therefore preferable to actuate the handle with the aid of the forearm to prevent any contamination.

To facilitate control of the mechanism (here the latch), the length of the handle 12 according to the invention is greater than that of a conventional "manual" handle so as to obtain an easier rotation thanks to a greater lever arm.

It is, of course, possible to fit each side or face of the opening element 10 with such a hygienic and ergonomic handle. The two handles situated on either side of the opening element are then symmetrical relative to the plane of the opening element 10. Therefore to fit doors with such handles on either side of the opening element, a set of two symmetrical handles is used.

Having these two symmetrical models in stock makes it possible to fit any left-opening or right-opening door, that is to say with hinges on the right or on the left.

Figure 12:
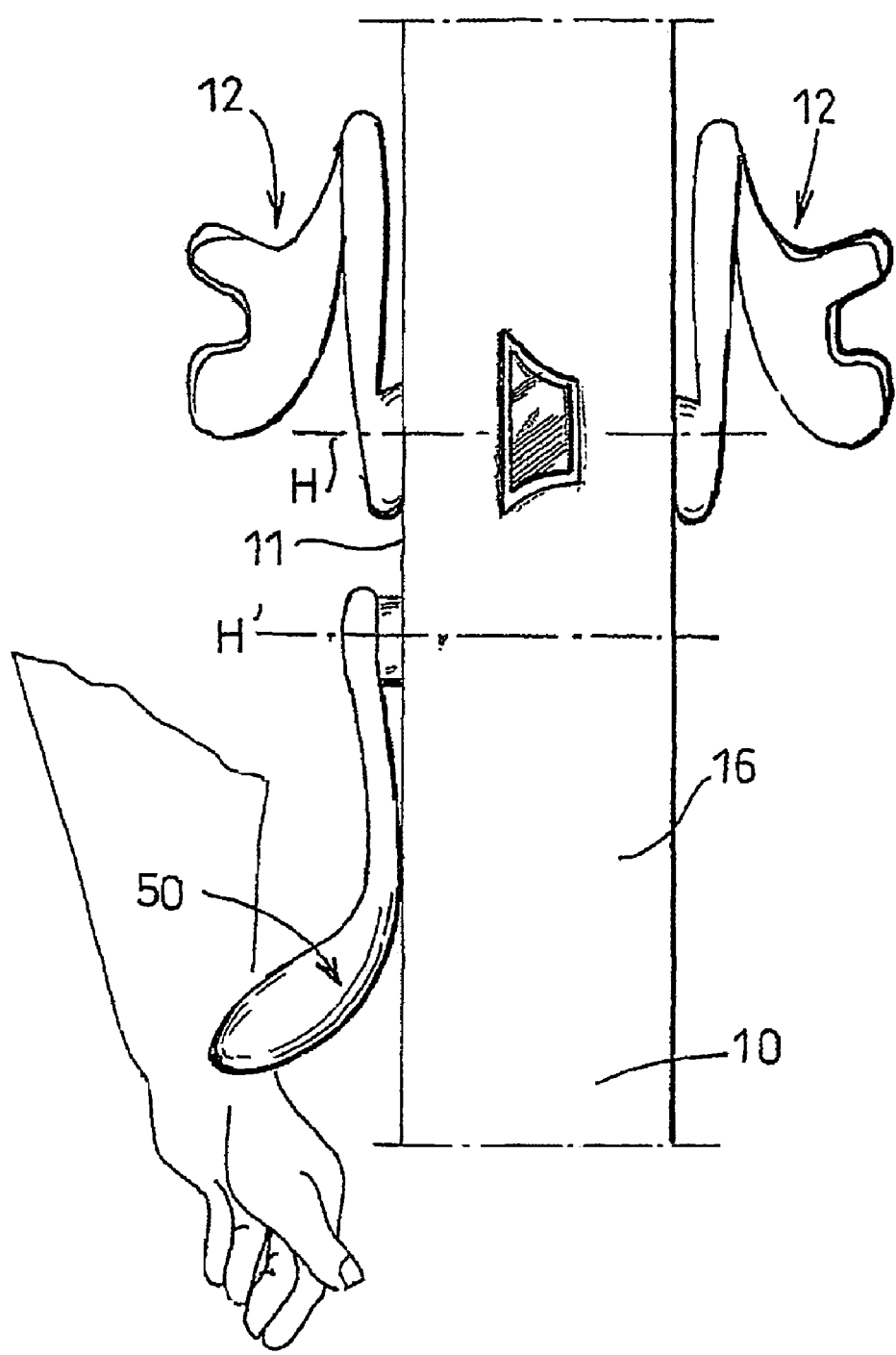
FIG. 12 is a schematic view from the right relative to the view of FIG. 1 representing the door fitted with a pair of symmetrical handles (one on each face) and with a hygienic member for controlling a latch according to the invention.

The opening element 10 illustrated in FIGS. 1 and 12 is also fitted with a latch or latching mechanism that is furnished with a hygienic turning member 50 for operating the latching or unlatching that can, according to the teachings of the invention, be actuated without the aid of the fingers or of the hand.

The control member, or latch handle, 50 according to the invention is for example made of molded plastic in a single piece, in the same manner as the handle 12.

Figure 11:
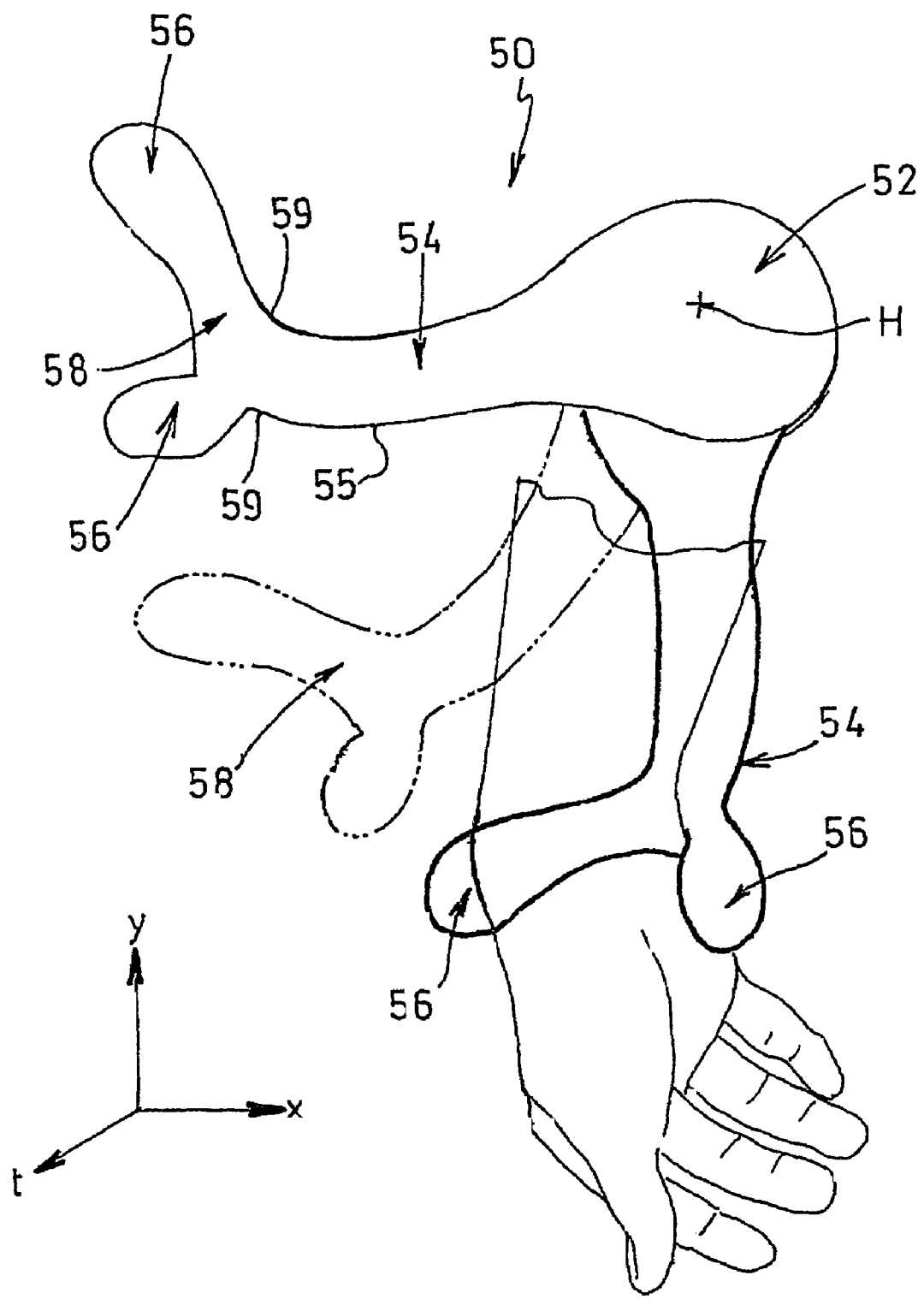
FIG. 11 is a schematic view in perspective of a hygienic member for controlling a latch illustrating its hygienic and ergonomic use.

Such a member 50, illustrated in FIG. 11, comprises a distal end hub 52 capable of being mounted so as to rotate about an axis H' orthogonal to the plane of the face 11 of the opening element 10 so as to occupy for example a first "bottom" extreme angular position in which the door is unlatched and a "top" extreme angular position in which the door is latched.

The two extreme positions are here offset angularly by approximately 90 degrees of angle so that, in the bottom position, the handle 50 extends generally in a horizontal plane while, in the bottom position, the handle 50 extends here generally in a vertical plane.

According to the existing variants of latching mechanisms, the two positions described hereinabove may be inverted and oriented in a different manner.

The hub is attached close to the vertical free edge 16 of the opening element 10 beneath the hub 18 of the door handle 12 and substantially in line with the latter.

The hub 52 consists of a hollow pot so as to receive means (not shown) for attaching the latch handle 50 to the opening element 10 while additionally providing the rotational connection of the handle with the shaft of the latching mechanism and the determined angular positioning of the hub 52, and hence of the handle 50, relative to this shaft and hence relative to the opening element 10, and it has a substantially rounded shape like the trunk of an ellipsoid.

The latch handle 50 comprises a main branch (or body) 54 of which a first distal end is connected to one end of the hub 52 and of which the second proximal end is extended by two secondary proximal end branches 56.

The two secondary end branches 56 part symmetrically on either side of the mid-plane of the latch handle 50 that is a plane orthogonal to the plane of the door, that is to say parallel to the axis of rotation H'.

The secondary branches 56 delimit between them a hook 58 in the general shape of an open C-shaped basket-handle curve. Curvatures 59 at the connection of the two branches 58, on either side of the latter will also be useful for the rest of the description.

The main branch 54 comprises a first portion in the shape of an elbow or neck 55 so as to extend first in a plane parallel to the plane of the face 11 then in a plane orthogonal to the face 11 away from the opening element 10.

The secondary branches 56 extend symmetrically relative to the mid-plane of the latch 50 in the same plane as the second portion of the main branch 54.

The latch handle 50 may occupy two positions substantially orthogonal to one another. In the "bottom" position corresponding to the unlatched position of the door, the main branch 54 extends generally vertically toward the ground. The two symmetrical secondary branches 56 then extend away from the face 11 and generally in a common horizontal plane.

In the "top" position corresponding to the latched position of the door, the main branch 54 extends generally horizontally and the symmetrical secondary branches then extend generally in a common vertical plane orthogonal to the face 11.

To move from one extreme position to the other, the user usually places his forearm or his wrist in the basket-handle curve or hook 58 that is generally open away from the face 11 with its concavity oriented so as to receive for example the forearm of the user.

The user actuates the latch by acting on the handle 50 by causing a quarter-turn rotation. The user may also place his forearm or his wrist on the outside of the hook 56, at the curvatures or curved zones 59 that exist between the main branch 54 and one of the secondary branches 56 and exert a pressure to latch or unlatch the door.

According to another aspect of the invention, a generally Y-shaped control member like the member 50 may be used to control or actuate an opening/closing mechanism of a faucet called a mixer or mingler faucet to adjust the water flow and the water temperature, by means of the arm, the wrist or the forearm.

Figure 13:
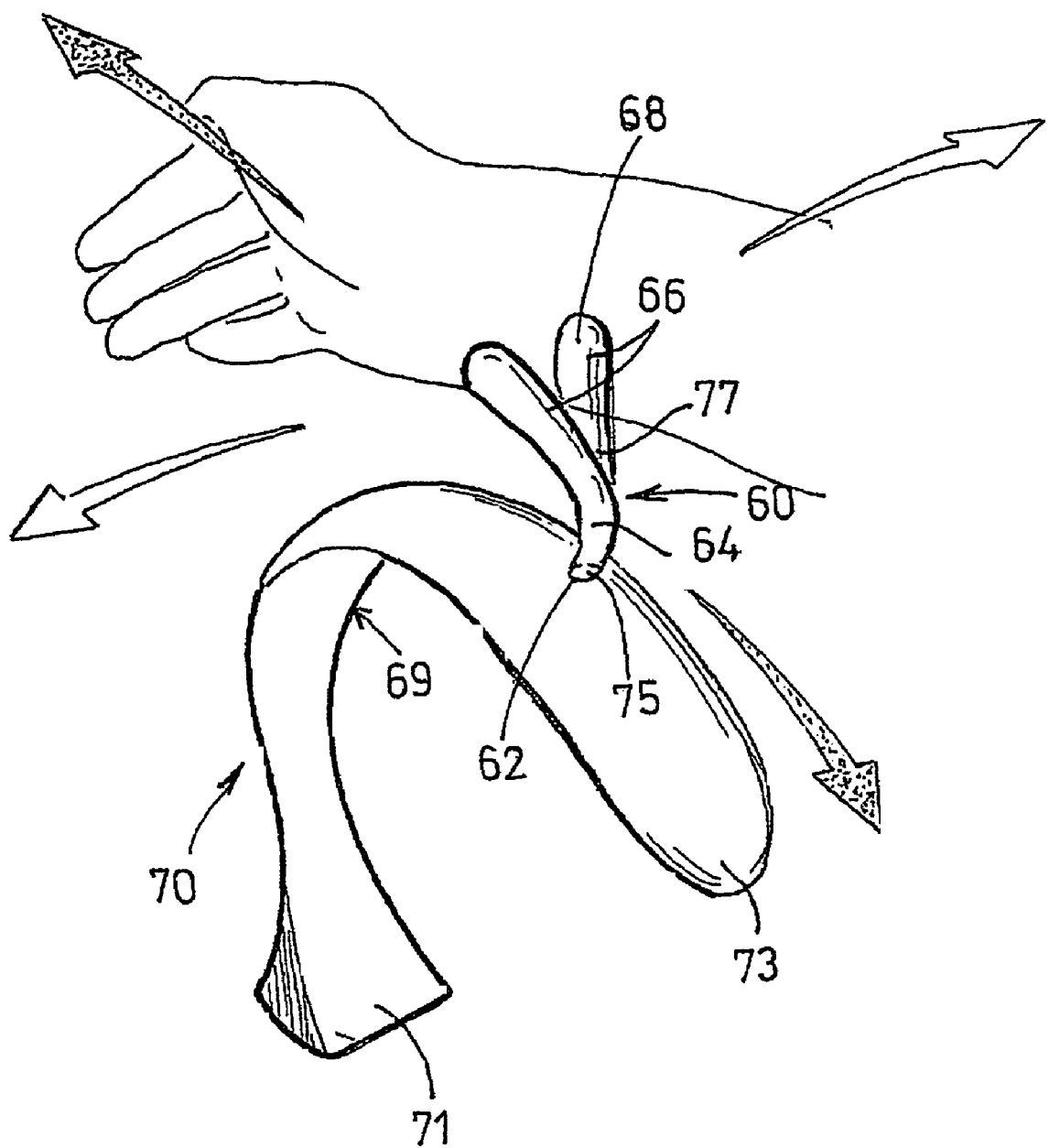
FIG. 13 is a schematic view in perspective that represents a mixer faucet body fitted with a hygienic control member according to the invention.

The control member or lever 60 according to the invention, illustrated in FIG. 13, is mounted generally so as to rotate about a point or center 62, by means not shown of the ball-and-socket or Cardan type.

The control lever 60 is mounted, in a known manner, on the upper face of the body 69 of a mixer faucet 70 in the general shape of a more or less pronounced "swan neck".

A rear and lower end 71 of the body 69 is capable of being mounted on the rear edge of the basin (not shown), while its front free end 73 oriented toward the user of the washbasin or the bowl comprises the water outlet orifice.

The lever-shaped control member 60 comprises a first stem 64 forming its main body which, in the mid-position of rest illustrated in the figure extends in a vertical plane upward and over the faucet 70 from its first articulated distal end 75.

The lever 60 also comprises two ancillary or secondary stems 66 which extend from the second end 77 of the main stem 64 and which part symmetrically on either side of the mid-plane here of symmetry of the control member 60 that is a vertical plane.

The secondary proximal free end stems 66 delimit between them a hook 68 in the general shape of an open C-shaped basket-handle curve that is capable of receiving an arm, a forearm or a wrist.

The two symmetrical and opposing proximal stems 66 extend in a common plane that is inclined relative to the horizontal and that is oriented toward the rear of the faucet 70.

The user usually places his wrist inside the concavity of the basket-handle curve or hook 68.

He may then exert an appropriately oriented force to rotate the control member 60 about the point 62, from front to rear and/or from left to right of the faucet 70 so as to adjust both the water flow and the temperature, without using the contaminated parts of the hand such as the palm of the hand or the fingers.

The design according to the invention makes it possible to easily fit washbasins or bowls either by replacing the faucet or by replacing the conventional lever of the mingler faucet.

In the general context of the battle against the propagation and transmission of germs and bacteria, and/or for the control of the bacterial transmission flows, in which the invention participates effectively through the various aspects evoked hereinabove, the use of mixer or mingler faucets is particularly effective insofar as the point of closure or of opening of the flow is situated very close to the water outlet orifice, thus reducing to a minimal value the length of the section of duct open to the outside and hence to pollution, in which the bacteria and germs may stagnate and proliferate.

The invention claimed is:

1. A hygienic turning handle (12) capable of being fitted to the opening element (10) of a door to control the actuation of a mechanism, fitted to the opening element (10) from a rest position toward which the handle is elastically returned, and to allow the opening element to be pivoted about a vertical axis (A), the handle (12) being of the type comprising:

a distal end hub (18) mountable, on one main vertical face (11) of the opening element (10), to rotate about an axis (H) orthogonal to the plane of said face (11) of the opening element (10), said distal end hub (18) extending along the axis (H) orthogonal to the plane of the face (11) of the opening element (10) terminating at a free end portion of the hub at a first distance (D4), in the direction of the axis (H), from the plane of the face (11) of the opening element (10);

a main body (20) comprising a first end (22) connected to said free end of the hub (18) at the first distance (D4) and with a second end (24) terminating at a second distance (D3) less than the first distance (D4), in the direction of said axis (H), from the plane of the face (11) of the opening element (10), said main body (20) extending, vertically upwardly from the first end to the second end, in a plane generally parallel to said plane of said face (11) of the opening element (10), and extending away from a nearest vertical edge (16) of said opening element (10) of the door; and an actuation section (26) of curved shape connected to the second end (24) of the main body (20), said actuation section (26) comprising a concave inner surface (36) that is generally C-shaped and with a maximum length that overall extends from said second end (24) of the main body (20), away from the plane of the door, said actuation section (26) having an overall concavity open upward and oriented generally upward and in the direction of the free edge (16) of the opening element (10) of the door, a chord drawn between ends of the overall concavity of the actuation section (26) being generally parallel to said axis of rotation (H) orthogonal to the plane of the face (11) of the opening element (10), wherein, a length of the main body (20) along the door is greater than a length of the actuation section (26) along the door, in the rest position of the handle (12), the concavity (36) of the actuation section (26) is oriented generally upward and is capable of receiving a portion of the arm, the wrist or the back of the hand of a user, and the actuation section (26) extends in a plane that is generally parallel to the axis of rotation (H) and which, in the rest position, forms an acute angle A1 relative to the horizontal that lies between 30 and 60 degrees with a final terminating free end of the actuation section being vertical above the distal end hub.

2. The handle (12) as claimed in claim 1, wherein the actuation section (26) forms the acute angle A1 relative to the horizontal equal to approximately 50 degrees.

3. The handle (12) as claimed in claim 1, wherein the distance D1 between the bottom of the concavity (36) of the actuation section (26) and the axis of rotation (H) is approximately 200 mm.

4. The handle (12) as claimed in claim 1, wherein the distance D2 between the bottom of the concavity (36) of the actuation section (26) and a horizontal line passing through the axis of rotation (H) is approximately 115 mm.

5. The handle (12) as claimed in claim 1, wherein the main body (20), extending a in plane generally parallel to the plane of the face (11) of the opening element (10), is in the shape of a "swan neck" whose concavity is oriented generally downward and whose summit (28) is situated above the actuation section (26).

6. The handle (12) as claimed in claim 1, wherein the second distance (D3) between the second end (24) of the main body (20) and the plane of the face (11) of the opening element (10) is less than the first distance (D4) between the first end (22) of the main body (20) and the plane of the face (11) of the opening element (10) of the door.

7. The handle (12) as claimed in claim 1, wherein the actuation section (26) flares out progressively up to its free end (34) so as to delimit a concave actuation surface (36) ending in two lobes (38) and (39) making the actuation of the handle (12) in translation easier in order to pull or push the opening element (10) of the door.

8. The handle (12) as claimed in claim 1, wherein the contour of the cross section of the actuation section (26) is rounded.

9. The handle (12) as claimed in claim 1, wherein the main body (20) is of generally circular or elliptical cross section.

10. The handle (12) as claimed in claim 1, characterized in that it is made by molding in a single piece.

11. The handle (12) as claimed in claim 2, wherein the distance D1 between the bottom of the concavity (36) of the actuation section (26) and the axis of rotation (H) is approximately 200 mm.

* * * * *